May 26, 1959 — P. MANIS ET AL — 2,888,058
RUBBER CHAFER AND METHOD OF MAKING THE SAME
Filed Oct. 22, 1954 — 2 Sheets-Sheet 1
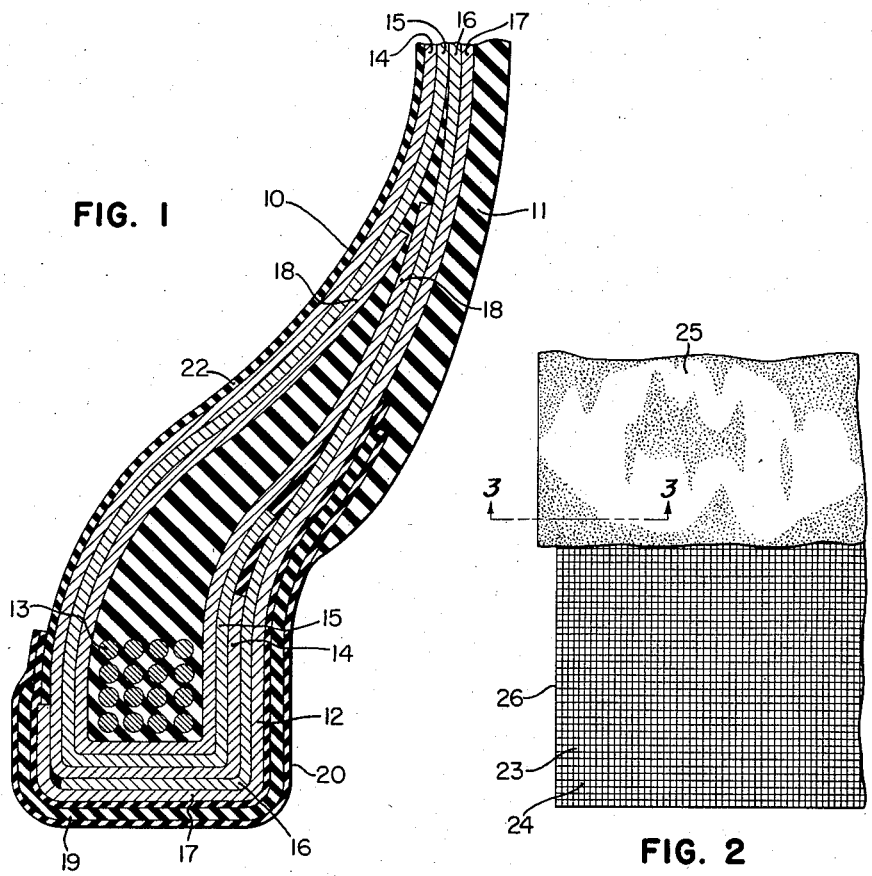
FIG. 1
FIG. 2
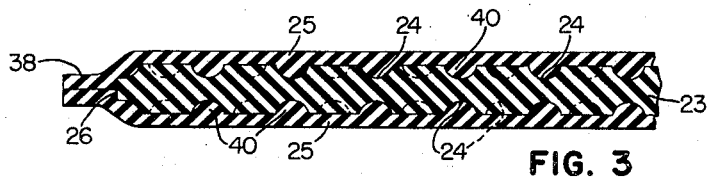
FIG. 3
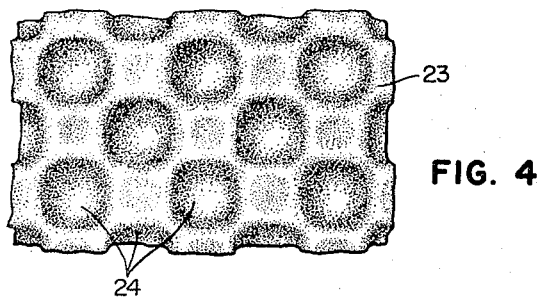
FIG. 4
*INVENTORS*
PETER MANIS
BY DONALD R. VOGELSANG
R. L. Miller
ATTORNEY May 26, 1959 P. MANIS ET AL 2,888,058
RUBBER CHAFER AND METHOD OF MAKING THE SAME
Filed Oct. 22, 1954 2 Sheets-Sheet 2
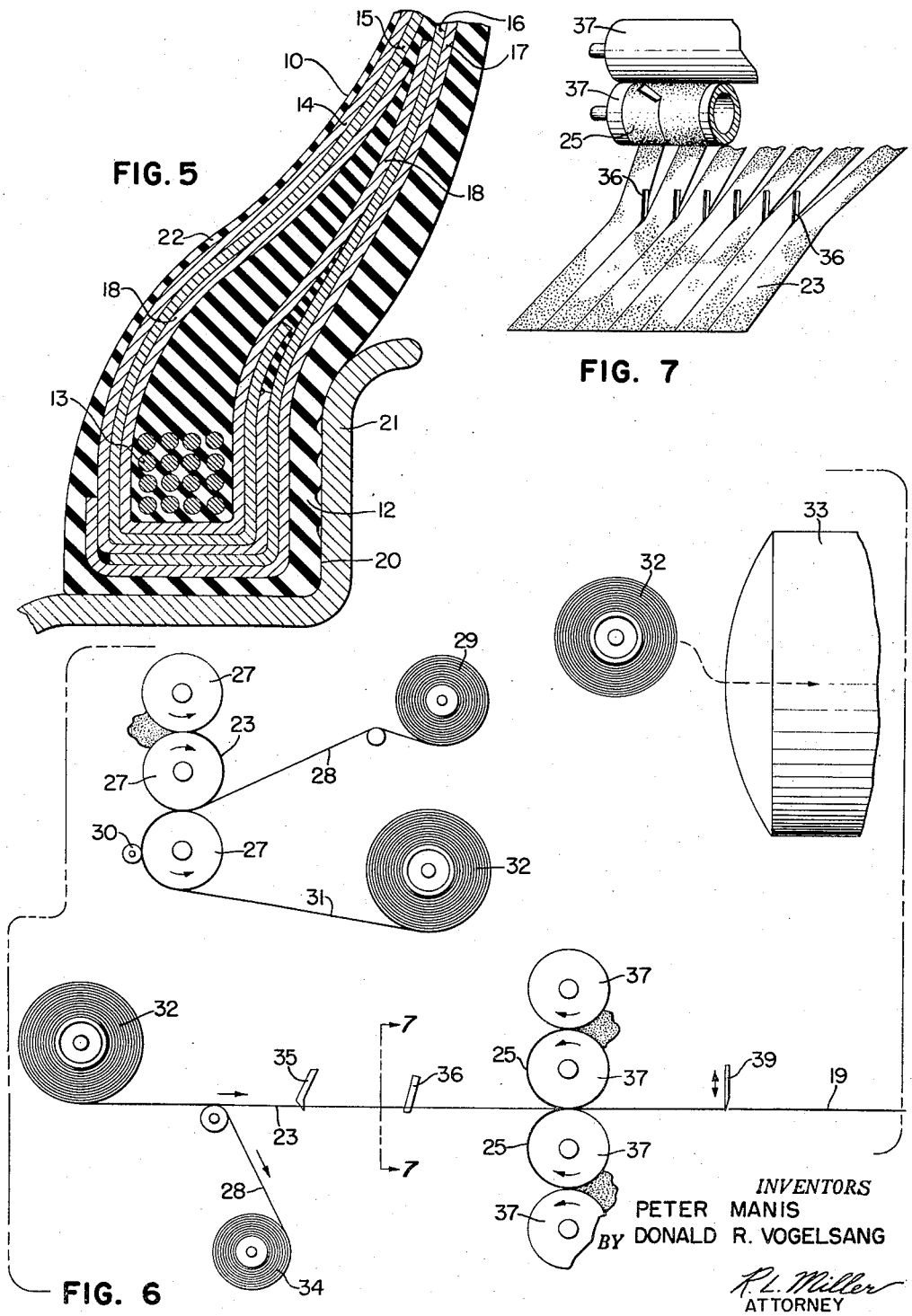
INVENTORS
PETER MANIS
DONALD R. VOGELSANG
BY
P. L. Miller
ATTORNEY

United States Patent Office 2,888,058
Patented May 26, 1959

2,888,058

RUBBER CHAFER AND METHOD OF MAKING THE SAME

Peter Manis and Donald R. Vogelsang, Akron, Ohio, assignors to The Goodyear Tire & Rubber Company, Akron, Ohio, a corporation of Ohio Application October 22, 1954, Serial No. 464,009

9 Claims. (Cl. 152—362)

This invention relates to an improved chafer strip for use with tubeless tires and a method of making the same. More specifically, it relates to chafer strips which are impervious to the passage of air and are dimensionally stable during the curing operation.

With the advent of tubeless tires, tire manufacturers have been faced with the problem of preventing the inflationary air of a tubeless tire from escaping. Inflationary air will seek the path of least resistance through the tire carcass to the atmosphere. In the ordinary tire, chafer strips have been made from cross-woven yarn or cord fabric having axially extending interstices which permit inflationary air to diffuse directly through the chafer strip into an area of the sidewall which is exposed to the atmosphere. The ordinary fabric chafer thereby provides a direct channel from internally to externally of the tire through which inflationary air may escape and the rate of diffusion of air through the chafer will be increased as the chafer is frayed by abrasion against the rim.

It is an object of this invention to provide an air-impervious chafer for use with pneumatic tubeless tires which permits the fabrication of a tubeless tire in substantially the same manner that a conventional tire is fabricated. Another object of this invention is to provide a chafer strip made entirely of rubber which will remain dimensionally stable during the high temperature and pressure conditions of curing and which can be readily adhered to the tire carcass during the tire building operation.

Other objects will become apparent as the description of the drawings proceeds in which:

Fig. 1 is an enlarged cross section of the bead area of a tubeless tire constructed according to the present invention;

Fig. 2 is a plan view of the chafer made in accordance with the present invention;

Fig. 3 is a cross-sectional view taken along the lines 3—3 of Fig. 2;

Fig. 4 is an enlarged plan view of the inner ply of the chafer made in accordance with the present invention;

Fig. 5 is an enlarged cross section of the area of a tubeless tire constructed in accordance with the present invention after cure and mounted upon a rim;

Fig. 6 is a schematic view of the apparatus showing the sequence of steps and the method of the present invention;

Fig. 7 is a cross-sectional view in isometric taken along the lines 7—7 of Fig. 6.

Referring to the drawings, the invention is shown as applied to a tubeless tire 10 comprising a casing of reinforced rubber material having sidewalls 11 and bead portion 12. In the bead portion 12 is disposed a circumferentially inextensible bead ring 13 encased in rubber and around which the reinforcing plies 14, 15, 16 and 17 are wrapped to anchor the plies and provide a unitary structure. The reinforcing plies are made of nylon, rayon, cotton or other suitable cords which extend from bead portion to bead portion with the endings of the outer plies 16 and 17 overlapping the inner plies 14 and 15. The bead rings 13 are provided with an inner reinforcing wrapper or flipper 18 which encloses the bead ring and has its marginal portions joined in face to face relationship and extending laterally onto the sidewall portion of the tire. The chafer strip 19 is wrapped around the bead portion outwardly of the reinforcing plies to prevent the abrasion created between the bead heel 20 and the rim 21 from chafing or fraying the reinforcing plies. The entire inner periphery of the tire may be covered with a rubber liner 22 as shown in Figs. 1 and 5 to assist in retaining air in the tire.

Referring to Figs. 2, 3 and 4, the chafer strip consists of an inner rubber ply 23 which is at least partially vulcanized and provided with indentations or serrations 24 on both sides thereof. The inner ply 23 is sandwiched between thin layers, or plies, of gum rubber 25 which extend beyond the longitudinal edge 26 of the inner ply 23. Along the longitudinal edges 26, the plies 25 are coextensively joined in a lap joint or in face to face relationship and preferably extend beyond the edge 26 for a distance of approximately one quarter of an inch.

In accordance with the present invention, the chafer strip 19 is made by the process and apparatus schematically shown in Fig. 6. The inner rubber ply 23, about 1/32 inch thick, is calendered into a continuous strip form on a calender roll 27. A heat shrinkable liner 28, preferably made of nylon, is fed into the nip of the rolls 27—27 from the liner supply roll 29. A pressure roll 30 compresses the rubber ply 23 onto the surface of the nylon liner 28 and the resulting lamina 31 is wound onto a roll 32. The roll 32 is driven and the roll 29 is braked so that a high degree of tension is applied to the liner 28 as it is being passed through the nip of rolls 27 and 27. Since the liner 28 is tensioned and in contact with the under surface of the rubber ply 23, the outer surface of roll 32 is continuously covered by the ply 23 compressed between successive layers of the liner. Before the liner roll 29 has been exhausted, the ply 23 is severed and the roll 32 is covered with the windings of the liner remaining on roll 29. The roll 32 is then placed in the pot heater 33 and heated at a curing temperature for a sufficient period of time to at least partially vulcanize the ply 23. Under normal conditions, the roll may be heated at approximately 285° F. for approximately 70 minutes. Since the liner contracts or shrinks when the temperature is increased, the effective pressure on the rubber ply 23 is substantially increased during the curing step so that both surfaces of the rubber ply 23 are embossed or serrated with a negative impression of the nylon liner 28. The liner 28 is made of tightly cross-woven cords of approximately .012 guage which forms the isolated, uniformly aligned and uniformly spaced indentations or serrations 24 having substantially constant depth and width, as shown in the enlarged plan view of Fig. 4.

After the roll 32 has been heated in the heater 33 so as to at least partially cure the ply 23, the roll 32 is withdrawn from the heater 33 and the liner 28 is stripped from the ply 23 and wound on roll 34 for re-use. Thereafter, the ply 23 is slit longitudinally by the knives 35 and the resulting strips or plies are positioned approximately one-half inch apart by a spreader 36 and immediately passed through calender rolls 37 wherein gum rubber plies 25 approximately ½ the thickness of ply 23 are frictioned or applied under pressure to both surfaces of the strips 23, and coextensively joined in a lap joint 38 extending transversely beyond the edges 26 of the separated plies 23. The plies 23 which have been gum-stripped on both sides are then cut or scored transversely to the proper chafer strip length by the knives 39.

Gum rubber will not readily adhere to vulcanized or partially vulcanized rubber. In the method provided by this invention, the isolated uniformly spaced indentations 24 of constant depth and width which are formed in both sides and for the complete width of the plies 23, produce a uniform mechanical bond, to supplement the normally poor adhesion between the ply 23 and plies 25. The mechanical bond is formed as the gum rubber plies 25 are forced under pressure against both surfaces of ply 26 causing the gum rubber to flow into the indentations 24, thereby forming projections 40 which interlock the plies 25 to the ply 23. Furthermore, the area of contact and the adhesion between plies 25 and ply 23 is substantially increased because the area of contact is extended into a third dimension by the indentations 24.

It is essential to the successful practice of this method that the gum rubber plies 25 be applied to the vulcanized strip 23 within a relatively short period after the strip 23 has been cured, since the strip 23 will lose tackiness due to blooming oxidation or vaporization of solvents. Preferably, the strip 23 is therefore plied with the gum rubber plies 25 within twelve hours after the cure of the strip 23. In the event that the strips 23 cannot be plied with gum rubber within a short period of time, the tackiness of the strip 23 may be preserved by applying a coating of rubber cement immediately after cure. Then, too, tackiness may be restored by buffing and/or applying a coating of rubber cement to the strip 23 immediately before calendering the gum rubber plies 25 onto the strip 23. However, the preferred method of applying gum rubber to the semi-vulcanized or vulcanized rubber within a short period after vulcanization and without buffing or cementing results in greater adhesion between the ply 23 and the gum strip 25.

The chafer strips 19 are applied to the bead portion 12 of the tire immediately prior to the application of the sidewall ply 11. As shown in Fig. 1, the sidewall overlaps the chafer 19 and the gum strip 25 forms a bond between the cured ply 23 and the sidewall stock 11 as well as between the ply 23 and the reinforcing ply 17. In the toe portion of the bead, the chafer 19 is adhered to the liner 22 and the gum rubber ply 25 forms a bond between the ply 23 and the liner 22 which prevents the chafer 23 from tearing loose from the liner 22 during the many handling operations between the time the tire is built and the time the tire is cured.

After the tire 10 has been built, soapstone is applied to the surface thereof and the tire is cured in a conventional tire-curing mold and subjected to curing temperature and pressure. During the cure operation, the rubber in the sidewall ply 11 flows downwardly over the chafer strip to form an integral coextensive bond with the chafer strip. Since the outer surface of ply 23 is coated with gum rubber, the bonding of the sidewall stock as it flows downwardly over the outer surface of the chafer strip is unaffected by the presence of soapstone and other foreign material thereon. Moreover, since the ply 23 of the chafer strip 19 has been at least partially vulcanized to render it dimensionally stable, the high pressure and temperature of the curing operation has little effect on the flowability of the ply 23. It is, therefore, seen that the dimensionally stable ply 23 will remain in the position shown in Fig. 1 during the curing operation so that the entire outer surface of the bead portion 12, and particularly the heel 20, will be provided with a substantial thickness of rubber after cure to protect the ply 17 from being frayed by abrasion against the rim. Furthermore, the all-rubber chafer 19 is substantially air-impervious which alleviates the problem of inflationary air bleeding or diffusing directly through the chafer strip to an area of the sidewall which is exposed to the atmosphere.

While certain representative embodiments and details have been shown for the purpose of illustrating the invention, it will be apparent to those skilled in this art that various changes and modifications may be made therein without departing from the spirit or scope of the invention.

We claim:

1. A method of making chafer strips for use with tubeless tires comprising forming a sheet of uncured rubber, subjecting the sheet to pressure between fabric material and to a vulcanizing temperature to serrate the surfaces thereof and at least partially cure the sheet, mechanically bonding uncured rubber stock to both sides of the partially cured sheet, and cutting the sheet transversely into chafer strips.

2. A method as claimed in claim 1 in which the sheet of rubber is embossed before curing.

3. A method of making chafer strips for use with tubeless tires comprising forming a sheet of uncured rubber, compressing the sheet between strips of fabric and subjecting the sheet to heat until the sheet is at least partially vulcanized, stripping the fabric from the vulcanized sheet, applying unvulcanized rubber to both sides of the sheet and cutting the sheet into chafer strips.

4. A method of making chafer strips for use with tubeless tires comprising forming a sheet of uncured rubber, compressing the sheet against a tensioned heat shrinkable fabric liner, winding the liner and sheet into a roll, subjecting the sheet and liner to heat until the sheet is at least partially vulcanized and to shrink the liner so as to increase the compression on the sheet, stripping the liner from the vulcanized sheet, calendering unvulcanized rubber to both sides of the sheet and cutting the sheet into chafer strips.

5. A method of making chafer strips for use with tubeless tires comprising forming a sheet of uncured rubber, compressing the sheet against a tensioned heat shrinkable fabric liner, winding the liner and sheet into a roll, subjecting the sheet and liner to heat until the sheet is at least partially vulcanized and to shrink the liner so as to increase the compression on the sheet, stripping the liner from the unvulcanized sheet, calendering a ply of gum rubber on both sides of said sheet, said plies of gum rubber being wider than said sheet and forming a lap joint along the longitudinal edge of said sheet, and cutting the sheet and gum rubber plies to form chafer strips.

6. A method of making chafer strips for use with tubeless tires comprising forming a sheet of uncured rubber, compressing said sheet between embossing surfaces to form indentations on both sides of said sheet which are uniformly aligned and spaced with respect to each other, subjecting the sheet to heat until the embossed sheet is at least partially vulcanized, plying uncured rubber to both sides of said embossed sheet and into said indentations and cutting the plied sheet into strips.

7. A tubeless tire comprising a hollow, annular body of resilient rubber-like material open at the radially inner portion, said tire having wheel engaging bead portions at the inner periphery and each of said bead portions having applied thereto a strip of at least partially vulcanized rubber which is coated on both sides with unvulcanized rubber, said strip of vulcanized rubber having isolated indentations embossed on both sides thereof which are aligned longitudinally and transversely of said strip.

8. A tubeless tire as claimed in claim 7 in which said indentations are uniformly spaced from each other and disposed over the entire surface of said sheet.

9. A tubeless tire as claimed in claim 7 in which said unvulcanized rubber coating extends beyond the longitudinal edges of said strip for a substantial distance, said edges being coextensively joined together by a lap splice.

References Cited in the file of this patent

UNITED STATES PATENTS 1,591,816    Hawkinson  _____ July 6, 1926

(Other references on following page)

UNITED STATES PATENTS

| | | |
|---|---|---|
| 1,666,009 | Haney | Apr. 10, 1928 |
| 1,881,337 | Willis | Oct. 4, 1932 |
| 2,012,935 | Smith et al. | Aug. 27, 1935 |
| 2,366,209 | Morris | Jan. 2, 1945 |
| 2,541,550 | Sarbach | Feb. 13, 1951 |
| 2,575,378 | Bender | Nov. 20, 1951 |
| 2,622,052 | Chandler | Dec. 16, 1952 |
| 2,698,042 | Perkins | Dec. 28, 1954 |
| 2,701,221 | Clayton et al. | Feb. 1, 1955 |
| 2,710,042 | Gates | June 7, 1955 |
| 2,742,942 | Owen | Apr. 24, 1956 |
| 2,756,800 | Riggs | July 31, 1956 |

FOREIGN PATENTS

| | | |
|---|---|---|
| 694,294 | Great Britain | July 15, 1953 |